(No Model.)

E. SALOMON.
ANTI-FRICTION BEARING.

No. 265,152. Patented Sept. 26, 1882.

Witnesses:

Inventor
Etienne Salomon,
Per: Atty.

UNITED STATES PATENT OFFICE.

ETIENNE SALOMON, OF MONTREAL, QUEBEC, CANADA, ASSIGNOR OF ONE-HALF TO EDMOND ARMANT, OF SAME PLACE.

ANTI-FRICTION BEARING.

SPECIFICATION forming part of Letters Patent No. 265,152, dated September 26, 1882.

Application filed June 13, 1882. (No model.)

*To all whom it may concern:*

Be it known that I, ETIENNE SALOMON, of the city of Montreal, in the district of Montreal and Province of Quebec, Canada, have invented certain new and useful Improvements in Anti-Friction Bearings; and I do hereby declare that the following is a full, clear, and exact description of the same.

This invention relates to improvements in bearings and journals for shafts of steamboats, drilling machinery, turbine wheels, screw-jack heads, wagon-axles, lathe-points, and in fact all shaftings and moving parts of machinery, whether the same be arranged to work horizontally, diagonally, or vertically. Its object is to provide a bearing which shall be perfectly solid and steady while the shaft, &c., are moving, not liable to any but a very slight wear on account of those surfaces which are exposed to friction being reduced to a minimum, and capable of ready adjustment to compensate for such wear, besides being simple and inexpensive in construction and specially designed and arranged to either wholly do away with or greatly lessen the quantity of lubricant.

The invention may be briefly described as the combination, with a revolving shaft provided with an enlargement or collar and a suitable frame-work, of sleeves surrounding the shaft and screwed into parts of said frame-work, so as to be capable of adjustment, and a suitable number of round balls of steel or other suitable hard material arranged between the frictional surfaces of the collar on the shaft and the screwed sleeves. I either do away with a lubricant altogether by having balls or rollers at every frictional point, or leave those parts subject to very little wear to be lubricated from an oil-cup in any approved manner.

For screw and paddle shafts of steamers it is proposed to multiply the number of my anti-friction bearings by arranging two or more side by side or longitudinally on the shaft, as may be found necessary for steady and reliable action; but for all simpler uses with horizontal shafts, such as those mentioned, one double bearing will be sufficient, and for vertical shafts, only one bearing-surface being presented, only one set of balls will be needed, and the end of said vertical shaft may be grooved or shaped accordingly.

For full comprehension of my invention reference must be had to the accompanying drawings, in which similar letters to those used in this specification indicate like parts, and where—

Figure 1:
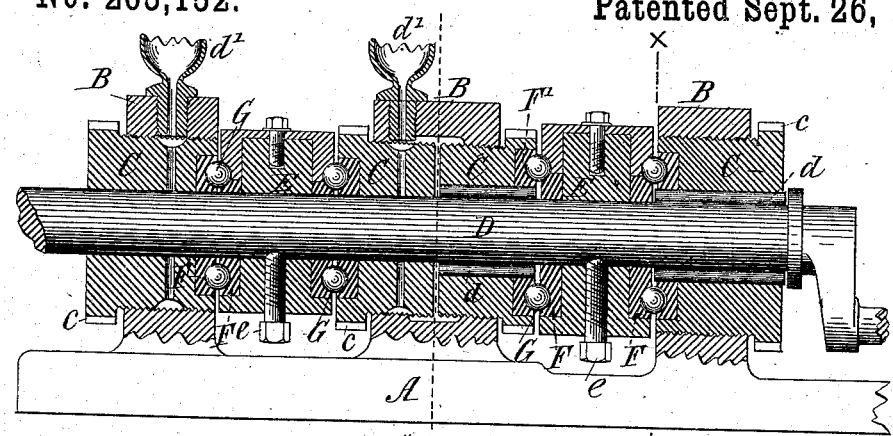
Figure 2:
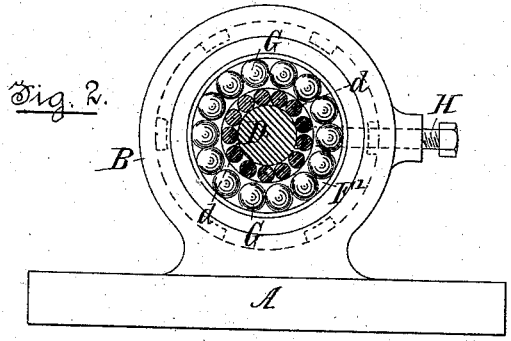
Figure 3:
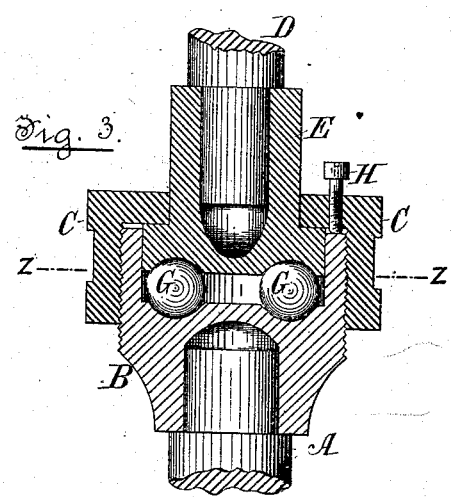
Figure 4:
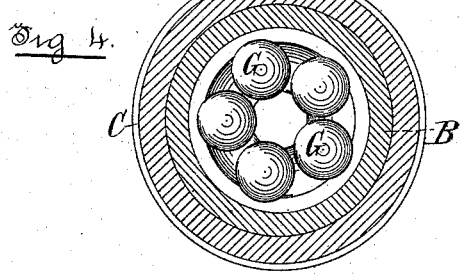

Figure 1 is a longitudinal sectional elevation, showing two of my improved bearings arranged in connection with the shaft of a steamboat, one bearing being constructed according to one modification and the other bearing in accordance with a more complete arrangement of my invention. Fig. 2 is a transverse section of same on line $x\ x$. Fig. 3 is a sectional elevation, illustrating one of my anti-friction bearings in connection with a vertical shaft; Fig. 4, a section taken through same on the line $z\ z$, and Fig. 5 a sectional detail view of device for inserting balls.

A represents a suitable cast bed-plate or framing, (referring now more particularly to Figs. 1 and 2,) having any suitable number of standard-bearings, B B. Into these are screwed sleeves C C, which have rims or flanges $c\ c$, provided with means for rotating said sleeves, such as indents or square or hexagonal heads.

D is the shaft, to which revolving motion is imparted in a manner suitable to the purpose for which it is employed. It is provided with one or more collars, E E, in this particular case—viz., that of a horizontal or steamboat shaft—slipped over said shaft and secured firmly thereon by set-screws $e\ e$. Countersunk in the sides of these collars are placed annular wearing rings or plates F F, of steel or other hard material, annularly grooved to receive round balls G G, of similar hard material.

Figure 5:
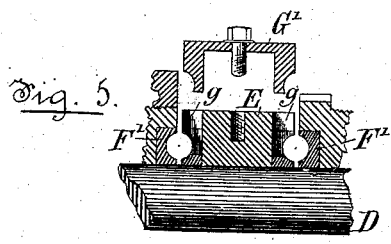

In the ends of the screwed collars C C are fitted annular wearing-plates F' F', similar to those marked F F, between which the round balls G G are held, the same being inserted through channels $g$, cut through the collars E and rings F. These channels are covered by plates G', secured by set-screws, all as shown in Fig. 5. The balls G are arranged so as to touch each other, and thus entirely fill the annular grooves prepared for them in the plates F F'.

Between the sides of collars E E and the screwed sleeves C C, and between the flanges or rims $c\ c$ and the standard-bearings B B, and (as shown in Fig. 1, where a double bearing is used) between the central sleeves, spaces are left, so that when the frictional surfaces—i. e., the balls G G and the wearing-plates F F'—become worn in the slightest degree, and the bearings in consequence rendered unsteady or loose, the sleeves C C can be readily screwed inward so as to again tighten the bearings.

In Figs. 2 and 3 I have shown a set-screw, H, which may, if desired, be provided with a leather washer on its point, for the purpose of holding the screwed sleeves firmly in place after they have been set, and to prevent any backward turning of the same; and I wish it to be understood that I may use more than one of these screws both in the horizontal and vertical arrangements, or any other device for effecting the same purpose, if it should be found necessary.

The bearings of the shaft D in the sleeves C C may either be provided with long rollers, $d$ $d$, to avoid friction, or may be lubricated from an oil-cup, $d'$, (both ways being represented in Fig. 1,) or, for lighter work, the shaft may fit the collars loosely and depend entirely on the rollers G G for rendering its movement easy.

If desired, the wearing-plates F and F' may be omitted and the annular grooves for the balls G G be formed directly in the collars E and sleeves C, or, as shown in the modification, Fig. 3, the sleeve C may be screwed outside the part B, which in this case is the equivalent of one of the standard-bearings shown in Figs. 1 and 2.

A suitable casing or covering will of course be provided for the entire longitudinal bearing; but the arrangement of the collar C in Fig. 3 will render this unnecessary for vertical shafts.

I am well aware that adjustable ball-bearings are not new, and have been used in various kinds of machinery, and I do not, of course, claim such bearings, broadly, my invention being limited to my peculiar and novel improvements thereon, as hereinbefore described, and as will now be claimed.

My invention will be found particularly valuable for the screw and paddle shafts of steamships, as it is a well-known fact that the series of annular collars or flanges rotating in grooves in a bed-block now in use become loose and shaky from wear, and thus materially damage the whole vessel by vibration, besides being extremely difficult to fit together accurately in the first place.

What I claim, and desire to secure by Letters Patent, is as follows:

1. In an anti-friction bearing, the combination of a bed-plate and stationary standards B B, of the longitudinal adjustable sleeves C C, secured to said stationary standards, and movable collars E, secured to the shaft, the said collar and stationary sleeves being provided with oppositely-placed grooves for the reception of anti-friction balls, all substantially as described.

2. The combination of the main shaft D, having the collar E rigidly secured thereto, said collar being provided with a countersunk wearing-ring, F, the stationary standard having the adjustable sleeves C, provided with corresponding bearing-ring, and the anti-friction balls forming a bearing between the said movable collar and stationary sleeve, substantially as described.

3. The combination of the central shaft, the stationary sleeve secured in the standard which supports the shaft, the movable collar secured rigidly to the shaft, the anti-friction balls, and the rollers $d\ d$ interposed between the adjustable collars and the shaft, substantially as described.

ET. SALOMON.

Witnesses:
R. A. KELLOND,
J. A. RENNIE.